UNITED STATES PATENT OFFICE 2,124,605

ALKYL CHLORIDES

Euclid W. Bousquet, Wilmington, Del., assignor, by mesne assignments, to E. I. du Pont de Nemours & Company, Wilmington, Del., a corporation of Delaware No Drawing. Application June 12, 1934, Serial No. 730,257

2 Claims. (Cl. 260—162)

The present invention relates to a process of making alkyl chlorides in which the alkyl group contains at least 8 carbon atoms and consists in reacting hydrogen chloride gas, under dehydrating conditions and in the presence of a metallic catalyst, with alcohols obtained by the hydrogenation of coconut oil.

It has previously been shown to make alkyl chlorides by the action of phosphorous halides upon alcohols or by the action of aqueous hydrochloric acid upon alcohols under pressure.

These methods are rather expensive and not well adapted to technical operations. It appears, furthermore, that the use of pressure demands excessively expensive equipment such as silver.

The process of my invention distinguishes from such prior methods in that it uses dry hydrogen chloride gas continuously passed through the heated mixture of alcohols and catalyst. A particularly advantageous feature of my invention is that the water formed during reaction is continuously removed as it is produced.

I achieve these objects by passing dry hydrogen chloride gas into the liquefied alcohol, in which a metallic chloride is suspended at temperatures above 100° C., preferably at about 130 to 140° C. and allowing the water formed in the reaction to distill off together with excess hydrogen chloride gas.

The alcohols from which I can produce the corresponding chlorides by this method are, for instance, octyl-, nonyl-, dodecyl-, tetradecyl-, cetyl-, octadecyl-alcohols or the mixtures of alcohols containing from 8 to 20 carbon atoms, such as are obtained by the hydrogenation of coconut or palm kernel oils, or I can also produce naphthenyl chlorides from the corresponding naphthenyl alcohols.

It is particularly adapted to the production of alkyl chlorides from primary alcohols of at least 8 carbon atoms.

It is not necessary in my process to use an absolutely anhydrous hydrogen chloride gas, a small amount of moisture in the gas is tolerable since water is formed in the reaction mixture. Hydrogen chloride obtained by burning chlorine in an excess of hydrogen or from the reaction of strong sulfuric acid on inorganic chlorides, such as sodium chloride, is suitable for use in my process. Sufficient hydrogen chloride gas should always be present in the reaction mixture to provide for an excess. In my preferred process I have passed the hydrogen chloride gas through the alcohol at a rate of flow of about ⅔ mole per mole of alcohol per hour.

The reaction temperature should be maintained above 100° C. so that the water of reaction as formed distills off and is removed together with the excess hydrogen chloride gas, which latter, after separation from the entrained water, can be re-used or re-circulated.

The temperature of the reaction should be higher for alcohols of higher molecular weight than for alcohols of lower molecular weight. For alcohols of from 10 to 14 carbon atoms I found that 130–140° C. is a very practical range at which side reactions are suppressed and yields approaching theoretical figures are obtained. The upper temperature limit depends entirely upon the temperatures at which the particular alcohol and its chloride undergo thermal decomposition, as a practical rule, however, I might state that it is generally unnecessary to employ temperatures above 200° C.

Effective catalysts promoting the formation of the higher alkyl chlorides which I therefore may call chlorinating catalysts, are the heavy metal chlorides, such as the chlorides of zinc, cadmium, iron, copper, antimony, bismuth, mercury and others.

Similar chlorides have already been used for the promotion of the reaction between alcohols and aqueous hydrochloric acid solutions, but as pointed out above these catalysts act in such a reaction as etherifying catalysts which results in the formation of large amounts of ethers, whereas under the conditions of my novel process substantially no ethers are formed. It was, for instance, found that by substituting aqueous hydrochloric acid for hydrogen chloride gas in my process (as applied to alcohols produced by the hydrogenation of coconut oil) that only 61% of the chloride mixture was formed, the balance being mainly ethers and other products resulting from side reactions.

The presence of the metallic chlorides is needed to make my reaction sufficiently rapid to be practical. In the absence of these catalysts the reaction between the hydrogen chloride gas and the alcohol is exceedingly slow.

The amount of metallic chlorides required in my reaction is relatively small, and in fact much less than is required in those processes involving refluxing aqueous hydrochloric acid with the alcohol. With 5% of zinc chloride figured on the weight of the alcohol I obtained satisfactory conversion. With increasing amounts of catalyst the reaction is speeded up and 10% of the catalyst is in most instances sufficient, though I have used as much as 20% without any detriment, except the additional cost.

After the reaction is completed I wash the reaction product with water to remove the catalyst and then preferably with sulfuric acid which dissolves whatever unreacted alcohol is left. The so obtained chloride is usually sufficiently pure for all technical purposes.

I usually apply my novel process to the molten alcohol without dilution.

I can, however, also suspend or dissolve the alcohol in an inert solvent, such as high boiling aliphatic or naphthenic hydrocarbons. In using a solvent which boils at the reaction temperature chosen, the boiling solvent assists in the removal of the water of reaction. The solvent is then condensed, the water separated therefrom by physical or chemical means and the solvent returned to the reaction mixture.

The process is applicable to either the batch or continuous process. In the latter I pass a mixture of hydrogen chloride gas and the alcohol through molten or dissolved zinc chloride or over a catalyst comprising a porous substance such as silicic acid gel or diatomaceous earth impregnated with zinc chloride or other metallic chloride.

My novel process is particularly well adapted to the formation of chlorides of dodecyl alcohol and the alcohols produced by the hydrogenation of coconut and palm kernel oil which contain largely dodecyl and tetradecyl alcohols with smaller amounts of homologous alcohols and will be illustrated in the following examples in respect to these alcohols and the use of zinc chloride as the catalyst. It will, however, be understood that my novel process is likewise applicable to the production of the alkyl chlorides from other aliphatic alcohols containing at least 8 carbon atoms up to about 20 carbon atoms or even more, and that chlorides of other heavy metals can be used as chlorinating catalysts.

*Example 1*

A mixture of 930 parts by weight of pure dodecyl alcohol and 93 parts anhydrous zinc chloride was heated at 130–140° C. and hydrogen chloride gas passed through the liquid mixture. The water of reaction formed was continuously removed from the reaction mixture by attaching a downward inclined condenser to the reaction vessel. At the end of five hours analysis for chlorine in the reaction product gave 16.45% chlorine or 95% conversion calculated from this chlorine value. The reaction product was washed with cold water and was then sufficiently pure for many technical uses. It was for further purification washed with cold concentrated sulfuric acid in which the oily lauryl chloride is practically insoluble.

*Example 2*

75 lbs. of crude dodecyl alcohol as obtained by the hydrogenation of coconut oil and containing a preponderent amount of lauryl alcohol with minor amounts of alcohols of from 8 to 14 carbon atoms, were mixed with 15 lbs. zinc chloride, heated to 138° C. and gassed with hydrogen chloride for 10 hours during which time the water of reaction formed distilled off as in Example 1. The reaction product was washed with water and represented an oily product consisting preponderently of dodecyl chloride with small amounts of the chlorides of the other alcohols contained in the original crude product. Analysis for halogen on the purified reaction product showed that the conversion was 96% complete.

The chlorides of the higher alcohols produced by my novel process are mainly intended as alkylating agents for the production of novel alkyl derivatives, such as alkyl-thiocyanates, an example of such use is, for instance, shown in a joint application of the present inventor with Paul L. Salzberg in application Ser. No. 649,450 filed Dec. 29, 1932.

It discloses broadly my novel process of making dodecyl chloride.

I claim:

1. The process for the hydrogen chloride esterification of alcohols obtained by the hydrogenation of coconut oil which comprises preparing an anhydrous reaction mixture containing the alcohol and a heavy metal chloride in an amount equivalent to at least about 10% of the alcohol, passing an excess of dry hydrogen chloride therethru while maintaining the reaction mixture at a temperature of from 130° C. to 140° C. and at atmospheric pressure, and then washing the reaction mixture with water to remove the heavy metal chloride.

2. The process for the hydrogen chloride esterification of alcohols obtained by the hydrogenation of coconut oil which comprises preparing an anhydrous reaction mixture containing the alcohol and zinc chloride in an amount equivalent to at least about 10% of the alcohol, passing an excess of dry hydrogen chloride therethrough while maintaining the reaction mixture at a temperature of from 130° C. to 140° C. and at atmospheric pressure, and then washing the reaction mixture with water to remove the zinc chloride.

EUCLID W. BOUSQUET.